Aug. 28, 1934.     T. BERBECK     1,972,005
AIRCRAFT
Original Filed July 21, 1931     3 Sheets-Sheet 1
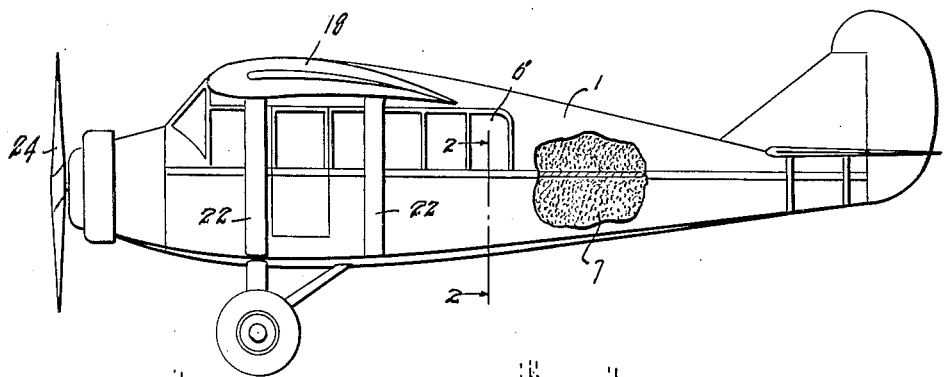
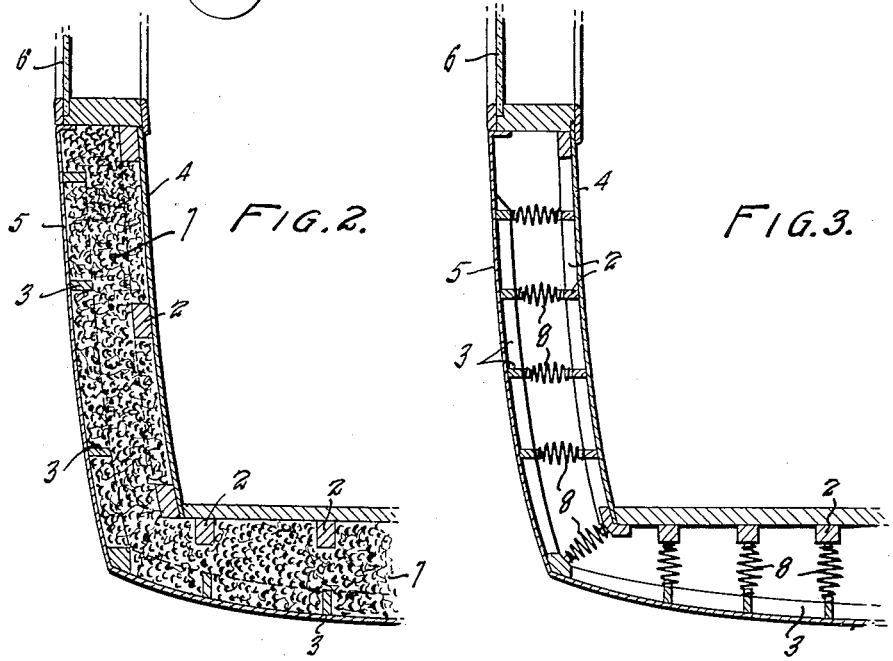
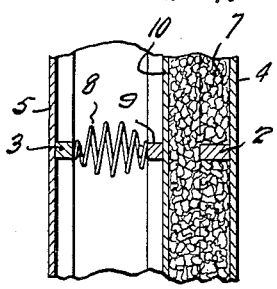
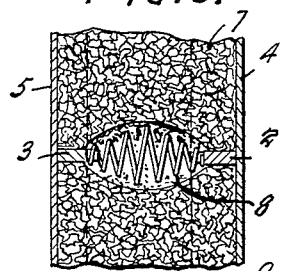
Inventor
TRIAN BERBECK
By Semmes & Semmes
Attorney Aug. 28, 1934. T. BERBECK 1,972,005
AIRCRAFT
Original Filed July 21, 1931  3 Sheets-Sheet 2
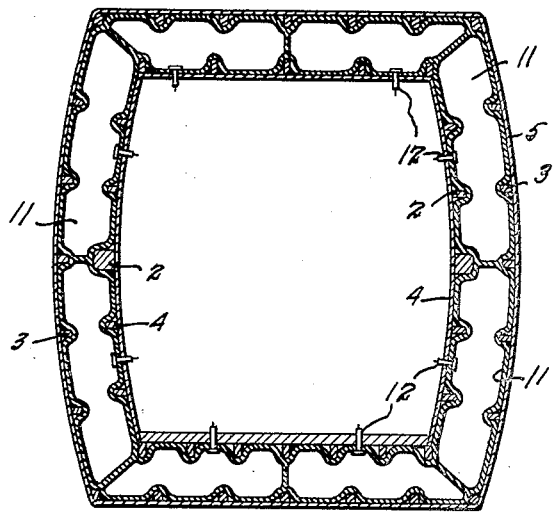
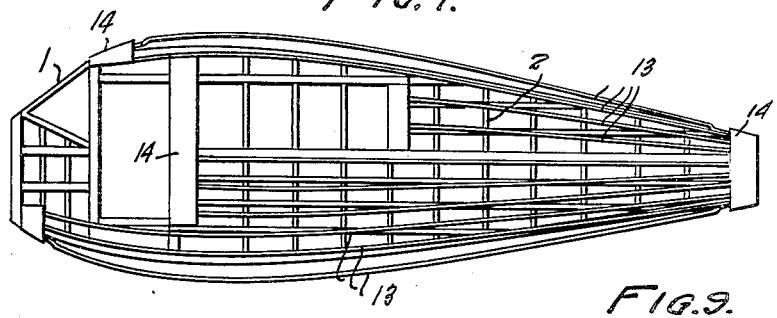
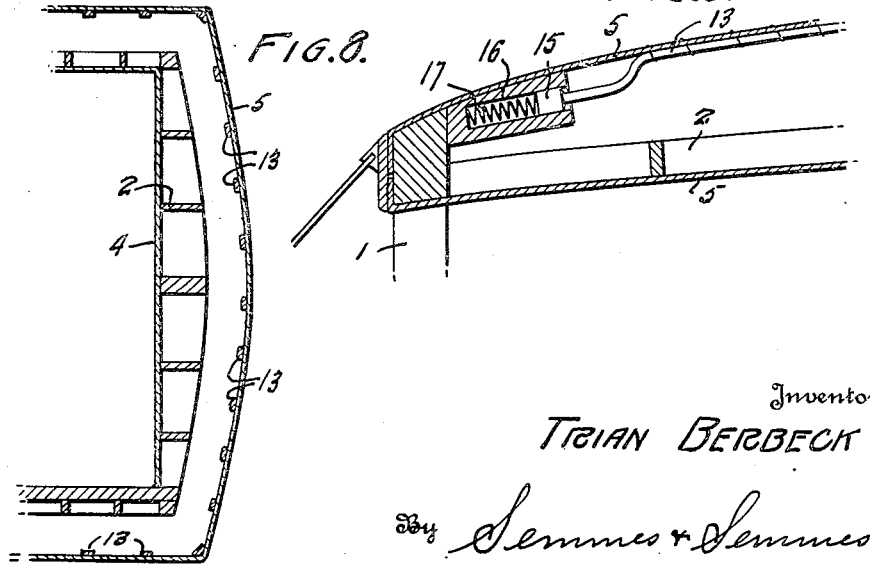
Inventor
TRIAN BERBECK Aug. 28, 1934.   T. BERBECK   1,972,005
AIRCRAFT
Original Filed July 21, 1931   3 Sheets-Sheet 3

Inventor
TRIAN BERBECK
By Semmes & Semmes
Attorneys

Patented Aug. 28, 1934

1,972,005

UNITED STATES PATENT OFFICE 1,972,005

AIRCRAFT

Trian Berbeck, Baltimore, Md.

Application July 21, 1931, Serial No. 552,228
Renewed January 27, 1934

3 Claims. (Cl. 244—30)

This invention relates to improvements in airplanes and more especially to methods and apparatus for preventing the transmission of sound and vibrations to the passenger compartments of aircraft.

It is well known that one of the outstanding disadvantages of air travel is that caused by vibration and noise which is present in the passenger carrying cabin or compartment of the present day airplane. The vibration, of course, is due to many causes, among which are the vibration set up by the engine, the vibration produced by the flutter or other movement effected upon rotation of the propeller blades through the air, and that caused by the air currents moving over various portions of the airplane structure as it passes through the air.

Most of the prior art attempts to cut down on the noise and vibration are directed primarily to the engine of the airplane. Applicant has found, however, that more successful results can be obtained by eliminating the cause or reducing the effect of the vibration produced by the propeller as it moves through the air and by the other air currents which play on other parts of the airplane structure.

One of the major objects of this invention is to avoid the disadvantages inherent in the prior art aircraft structure.

Another object of this invention is to so construct the walls of passenger carrying compartments of aircraft as to prevent or materially reduce the transmission of vibrations and sound into the passenger carrying compartment.

Yet another object of this invention is to provide an aircraft passenger carrying compartment formed of spaced walls in which is interposed means for absorbing or reducing the transmission of vibration and sound through the walls of the compartment.

Still another object of this invention is to so mount the sustaining surface of an airplane relative to the passenger carrying compartment as to minimize the transmission of vibrations from the sustaining surface to the passenger carrying compartment.

A further object of this invention is to so construct the passenger carrying compartment of an airplane as to prevent or reduce to a minimum the transmission or vibration of sound to the interior of a passenger carrying compartment.

A still further object of this invention is to so construct the struts, wings and other parts of an airplane as to materially reduce the vibration set up in the parts by reason of the flow of airstreams thereover.

A final object of this invention is to so construct an airplane propeller as to minimize the vibrations set up by the propeller blades as they travel through the air.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

The advantages of the prior art are avoided by the present invention by so constructing the passenger carrying compartment and/or other parts of an airplane as to materially reduce the transmission of vibrations or sound into the passenger carrying compartment.

One method of obviating the prior art disadvantages is to so construct the passenger carrying compartment as to prevent the transmission of vibrations through the walls of the same into the interior of the compartment. In accordance with applicant's invention, this may be accomplished by constructing the walls of the passenger carrying compartment of spaced apart members between which is positioned material capable of absorbing or reducing the transmission of vibration and sound. The various materials which may be interposed between the spaced walls of the passenger carrying compartment will be described hereinafter more in detail.

Another method in accordance with applicant's invention of obviating the prior art disadvantages is to construct the passenger carrying compartment with double walls, the outer wall of which is mounted on struts which are capable of flexing without transmitting the movement to the interior wall. Thus, when the outer wall is deflected by impingement of air streams or is moved by other vibrations set up therein, these vibrations will not be transmitted to the inner wall and thus into the passenger carrying compartment.

Another form of applicant's invention which reduces the vibrations set up in the interior of the passenger carrying compartment consists in so mounting the sustaining surfaces of airfoils relative to the passenger carrying compartment as to reduce the transmission of vibrations from the airfoil to the passenger carrying compartment. As hereinafter described, this may be accomplished by resiliently mounting the sustaining surface on the fuselage or passenger carrying compartment.

Still other methods and forms of construction to avoid the prior art disadvantages as hereinafter described, consist in covering parts of the airplane, such as lift struts, airfoil and propeller blades, with material which will tend to absorb or reduce the vibration of these parts by reason of impingement of airstreams on the surface thereof.

In order to make my invention more clearly understood, I have shown, in the accompanying drawings, means for carrying the same into practical effect, without limiting the improvements in their useful applications, to the particular constructions which, for the purpose of explanation, have been made the subject of illustration.

In the drawings:

Figure 1 is a side elevation of an airplane constructed in accordance with the present invention.

Figure 2 is a sectional view taken on line 2—2 of Figure 1, showing the details of construction of the passenger carrying compartment.

Figure 3 is a view similar to Figure 2, showing a modified form of construction.

Figure 4 is a fragmentary sectional view of the wall of a passenger carrying compartment showing another modified form of applicant's invention.

Figure 5 is a view similar to Figure 4, which illustrates a still further modification of applicant's invention.

Figure 6 is a sectional view of a fuselage or passenger carrying compartment of an airplane in which the space between the spaced walls is filled with gas cells for absorbing or reducing the transmission of vibrations.

Figure 7 is a perspective view of a frame of a fuselage constructed in accordance with a still further modification of applicant's invention.

Figure 8 is a sectional view of the structure shown in Figure 7.

Figure 9 is a detail sectional view illustrating the construction of a form of invention shown in Figure 7.

Figure 10:
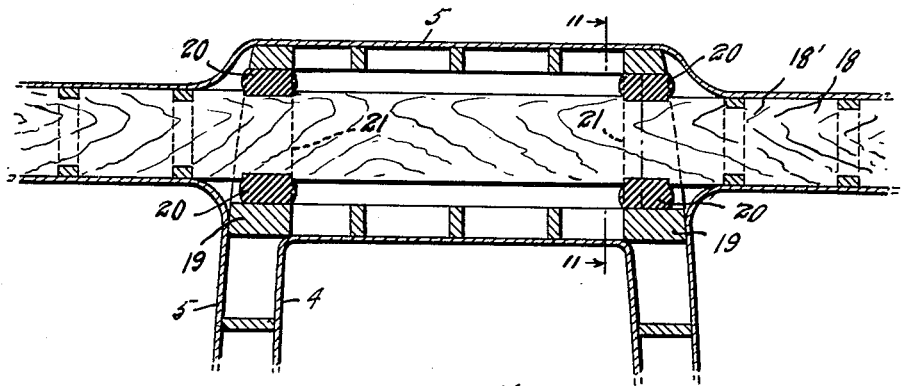
Figure 10 is a detail of the method of mounting a wing on a sustaining surface relative to the fuselage of an airplane in accordance with the present invention.

It is well known that the success of the present day automobile depends upon the developments in pneumatic tires. Prior to the use of pneumatic tires, transportation in automobiles which move at rather high speeds as compared to the old wagons, was not as comfortable for the passengers as was desirable. This was due to the transmission into the body or passenger carrying compartment of substantially all of the shocks produced by the irregularities of the road beds. Attempts were made to avoid the uncomfortableness of the vehicles by providing the passenger carrying compartments with cushions or seats of great resiliency. While this obviated the difficulty to a certain extent, nevertheless, travel was still comparatively uncomfortable until pneumatic tires were used. It is well known that the riding comfort of automobiles was still further improved by the widespread use of the so called balloon tires.

Applicant's present invention can be compared with an automobile equipped with balloon tires in that the shocks produced by travel over the road bed are absorbed or transmission of the same to the passenger carrying compartment is reduced to a minimum. Applicant in accordance with the present invention, seeks to absorb the vibrations produced by travel of the aircraft through the air, or to reduce to a minimum, the transmission of the vibrations into the passenger carrying compartment, which are set up by impingement of airstreams on various portions of aircraft. In other words, applicant's invention provides means whereby the shocks produced by travel of aircraft through the air will be absorbed in the same manner as the balloon tire absorbs the shocks as the automobile travels over a road bed.

It has been found that the transmission of vibrations into the interior of a passenger carrying compartment of aircraft may be prevented or reduced to a minimum by constructing the walls of the passenger carrying compartment of spaced apart members between which is positioned material for absorbing or reducing the transmission of vibrations and sound therethrough.

In Figures 1 and 2, an airplane construction has been shown in which the fuselage or passenger carrying compartment 1 is constructed of spaced apart supports 2 and 3 on which is positioned surfacing material 4 and 5, respectively. In other words, the skeleton of the fuselage may consist of the supports or struts which are covered by the material 4 for forming the interior wall of the cabin or passenger carrying compartment 1. Spaced from the skeleton formed of the struts 2 is a structure formed of the struts or supports 3, the outer surface of which is covered with surfacing material 5. Of course, the fuselage may be provided with suitable windows 6 constructed in the usual manner, or the windows 6 may be constructed of double thicknesses of transparent material, which tends to reduce the vibrations transmitted therethrough. Positioned in the space formed between the frames formed of the struts 2 and 3 is material 7 capable of absorbing vibrations and sound, or of materially reducing the transmission of the vibration and sound through the multiple wall of the passenger carrying compartment 1.

The material which is located in the space formed between the spaced apart walls of the fuselage may be any material capable of absorbing vibrations or capable of reducing the transmission of vibrations therethrough. By way of example, applicant has found that sponge rubber, mineral wool, asbestos fibre, felt, feathers and other material of this character may be successfully employed. Of course, any other material tending to absorb or reduce the transmission of vibrations therethrough may be employed to equal advantage.

In addition to filling the space between the spaced apart walls with sponge rubber and similar materials to absorb or prevent the transmission of vibrations from one of the spaced walls to the other, applicant has found that desirable results may be obtained by providing resilient means between the spaced apart walls.

In Figure 3 a construction based upon this concept has been shown. The parts in this figure, as well as in other figures, corresponding to the parts shown in Figure 2, have been given similar reference numerals. As clearly shown in Figure 3, the struts 2 and 3 of the inner and outer walls are positioned so as to correspond to each other. Between these struts is mounted a plurality of springs or other resilient members 8. With this construction, any vibration set up in the outer wall covered with the surfacing material 5 will not be transmitted to the inner wall of the passenger carrying compartment, or if it is transmitted, the intensity of the vibration will be materially reduced. Of course, it is obvious that in place of the springs 8, other equivalent means such as other types of springs or other types of resilient or absorbing means, such as pneumatic cylinders and the like may be substituted.

A still further modification of the present invention, which consists in another type of construction of the fuselage wall, is shown in Figure 4. As clearly shown in this figure, the wall of the fuselage is formed of three sets of struts. The innermost framework formed of the struts 2 is formed of the interior surfacing material 4. The exterior framework or skeleton formed of the struts 3 and the outer surfacing material 5 is spaced from the innermost wall a sufficient distance to permit the interposition of an intermediate wall which is built up on the framework formed by the struts 9. The intermediate wall is covered with material 10. Between the innermost and the intermediate wall is a space which is filled with material of the character employed in the constructions shown in Figures 1 and 2. Between the intermediate and the outer wall are located a plurality of resilient members 8 or equivalent structure. With this construction, it will be appreciated that the features of the constructions shown in both Figures 2 and 3 have been incorporated. In certain instances, such a construction may prove advantageous over either of the structures shown in Figure 2 or 3. For instance, when the space between the two walls is filled with resilient members, such as shown in Figure 3, there may be a tendency for noises to be transmitted, even though disturbing vibrations are reduced to a minimum. However, when both the resilient members and the material capable of absorbing sound and vibrations are employed, the transmission of both sound and vibrations is reduced to a minimum.

Figure 5 illustrates a modified construction in which the walls of the passenger carrying compartment of the airplane have the space therebetween filled with both resilient members and with material capable of absorbing vibrations and sound. The structure shown in Figure 5 is different from that shown in Figure 4, in that in Figure 5 the resilient members 8 are shown embedded in the material 7. This structure may have certain advantages over that shown in Figure 4, in that a more compact wall is provided. On the other hand, it is to be noted that the inner and outer walls are connected by the resilient members 8, whereas in Figure 4, the innermost wall is separated from the resilient member 8 by an interposed layer of absorbing material 7.

As a further illustration of the susceptibility of the present invention to modification, I have shown in Figure 6 a structure in which the space formed between the inner and outer walls of the passenger carrying compartment is filled with gas cells for absorbing or reducing the transmission of sound and vibrations from one wall to the other. As clearly shown in Figure 6, the space between the inner and outer walls is filled with pneumatic cells 11 provided with inflation valve stems 12. If desired, the entire space between the inner and outer walls may be filled with a single pneumatic chamber 11.

It has been found to be advantageous, however, in balloon construction to employ a plurality of gas cells rather than a single large gas cell. In Figure 6, therefore, I have shown a construction consisting of a plurality of spaced gas cells 11. When the cells 11 are inflated to the desired pressure found most advantageous for reducing the transmission of vibrations from the outer to the inner walls of the fuselage, one may ride in comfort within the interior of the fuselage or passenger carrying compartment without encountering all of the disturbances incurred in the present day travel in aircraft. For purposes of illustration, the structure shown in Figure 6 has not been provided with doors or windows, but this has been done merely for purposes of convenience in illustration, and it is to be clearly understood that doors or windows may be provided, for instance, as shown in Figures 1, 2 and 3 of the drawings.

While no means have been shown extending between the inner and outer walls other than the gas cells 11, it should be clearly understood that resilient or other members may be interposed between the inner and outer walls in order to properly support the same.

Still another form of the present invention is shown in Figures 7, 8 and 9. In this construction, it is unnecessary to interpose any material or resilient elements between the inner and outer walls of the fuselage. The fuselage as shown in Figure 7 is constructed in the usual manner, consisting of the framework 2 and in addition has an exterior framework formed of the longitudinally extending struts 13. The struts 13 which extend lengthwise of the passenger carrying compartment or the fuselage, are formed of material which is relatively flexible. The struts are so mounted on the framework of the fuselage as to be capable of flexing without causing any movement of the main structure of the fuselage. For instance, one end of the struts 13 may be anchored in the mounting 14 and the other end thereof could be provided with piston-like members 15 which are mounted in cylinders or slots 16 formed in a support 14' at the other end of the fuselage. In order to maintain the struts or elements 13 in their extended position, resilient members 17 are positioned in the cylinder 16 for urging the piston like end of the struts 13 outwardly. Of course, a similar construction may be provided in both the supports 14 and 14', if desired, but for most purposes, it is only necessary to have one end of the struts floatingly mounted.

With the construction just described, it will be appreciated that any vibrations set up in the outer wall of the fuselage will be transmitted into longitudinal movement of the piston like end of the struts 13. Instead of this movement being transmitted to the interior wall of the fuselage, it will be absorbed in the resilient members 17 positioned in the cylinder 16. Of course, in this instance, the flexible members 13 are covered with suitable surfacing material 5, which is generally of a flexible nature.

Figure 11:
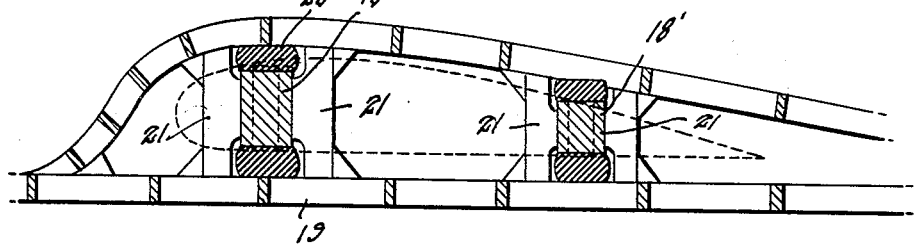
Figure 11 is a sectional view taken on line 11—11 of Figure 10.

As hereinbefore pointed out, the present invention seeks to reduce the vibration transmitted to the interior of the fuselage by providing a mounting between the sustaining surface or airfoil and the fuselage, whereby any vibrations set up in the airfoils will not be transmitted to the fuselage, or if transmitted, the intensity thereof will be reduced to a minimum. In Figures 10 and 11, a structure has been shown wherein an airfoil or sustaining surface 18 is shown resiliently mounted on the fuselage of an airplane. For instance, between the supporting members of the wing structure 18 and the beams 19 of the fuselage, resilient members 20 are positioned. With this construction, any vibration set up in the wing or sustaining surface 18 will be transmitted into the spar 18' of the wing 18, but the transmission from the member 18' to the beams 19 of the fuselage will be prevented by reason of the resilient material 20 interposed therebetween. For instance, as clearly shown in Figure 11, the spar 18' which is of greater width at its supporting portion is adapted to vertically move between the supports 21 carried by the beams 19 of the fuselage.

It will be appreciated that any vertical movement between the spar 18' and the members 21 is limited by reason of the resilient elements 20. Of course, in place of the resilient elements 20, which may be of rubber, equivalent members may be substituted.

Figure 12:
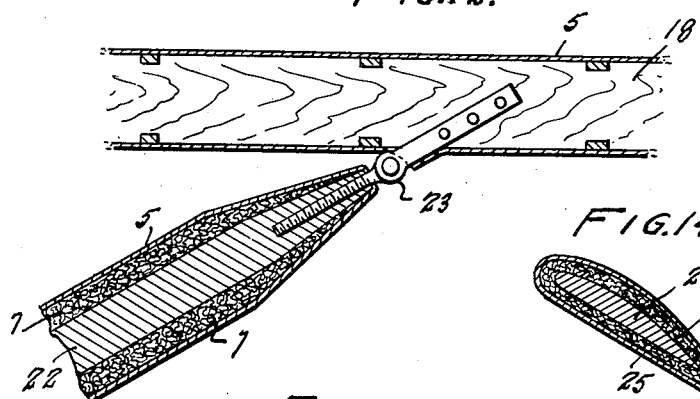
Figure 12 is a detail sectional view of a lift strut extending between a sustaining surface and the fuselage of an airplane.

As also hereinbefore intimated, the present invention seeks to eliminate, if possible, vibrations set up in portions of aircraft due to the flow of airstreams thereover. In certain aircraft, the wing structures are supported by struts constructed in the form of airfolds. These struts are known in the art as lift struts and have been indicated in Figures 1 and 12 of the drawings by reference numeral 22. These struts are generally connected with the lower portion of the fuselage and with the wing or sustaining surface by means which permit relative twisting between the strut and the wing or fuselage. In Figure 12, the strut 22 is shown connected to the wing 18 by such a connection, indicated generally by reference numeral 23.

It has been found that if the surfaces of the lift strut are covered with a relatively soft material capable of absorbing vibrations, the tendency of the struts to vibrate when impinged by airstreams flowing at certain velocities will be materially reduced. Thus, it will be appreciated that by covering the struts with a soft or resilient material equivalent to the material 7, employed in the structure shown in Figure 7, vibrations will not be set up in the lift struts. Of course, this principle may be applied to other parts of the airplane, and in some instances, the wings themselves may be covered with a material capable of absorbing vibrations tending to be set up by impingement of airstreams thereon.

Figure 14:
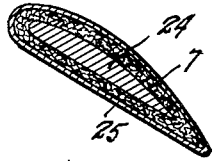
Figure 14 is a sectional view taken on line 14—14 of Figure 13.
Figure 13:
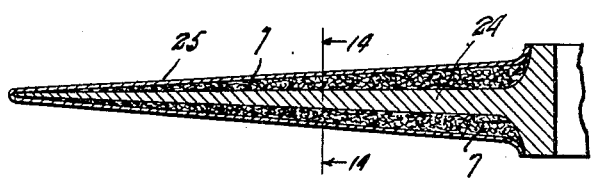
Figure 13 is a sectional view showing the manner in which the blades of an airplane propeller are formed in accordance with the present invention.

This principle of reducing the vibrations set up by impingement of airstreams on portions of an airplane has been shown in Figures 13 and 14, applied to the blades of a propeller. In these figures, the propeller 24 is shown covered with a thin layer of a vibration damping or absorbing material 7, and the outer surface is covered with a material 25, capable of withstanding the wear and tear which an ordinary propeller encounters. With this construction, the tendency of the propeller blade to flutter due to impingement of the air against the surface thereof will be reduced to a minimum. Consequently, if the flutter or vibration in the propeller blade is reduced, there will be less tendency for any vibration to be set up in the interior of the passenger carrying compartment. Of course, various other materials having a tendency to prevent or reduce vibration of the blades of propellers or of other parts of an airplane when impinged with airstreams may be employed in the present invention.

From the foregoing descriptions, it will be appreciated that the present invention provides structure whereby the transmission of vibrations into the passenger carrying compartment of aircraft is reduced to a minimum. In addition, the present invention provides structure whereby the tendency for vibrations to set up in certain parts of aircraft structure is reduced to a minimum. In addition, the present invention seeks to avoid transmission of vibrations set up in one part of the aircraft to other parts of the aircraft, which in turn will transmit the vibration to the interior of the passenger carrying compartment.

It will be appreciated that the present invention overcomes the disadvantages inherent in the prior art aircraft structures, in that the passenger carrying compartment will be substantially vibrationless and noiseless, due to vibrations set up by reason of impingement of air currents.

Of course, the present invention may be applied to aircraft in which the engine has been constructed so as to minimize vibration and noise. In this instance, the combination should result in the production of a substantially noiseless vibrationless aircraft.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In an airplane structure, a passenger carrying compartment having a plurality of struts spaced from the outer surface thereof and extending longitudinally of the passenger carrying compartment, each of said struts having one end anchored to the outer surface of the passenger carrying compartment and the other end floatingly attached thereto whereby vibrations set up in the outer struts will not be transmitted to the passenger carrying compartment.

2. In an airplane structure, a passenger carrying compartment having a plurality of struts spaced from the outer surface thereof and extending longitudinally of the passenger carrying compartment, each of said struts having one end anchored to the outer surface of the passenger carrying compartment and the other end floatingly attached thereto whereby vibrations set up in the outer struts will not be transmitted to the passenger carrying compartment, and means associated with the floatingly mounted struts for resiliently maintaining them in a predetermined position.

3. In an airplane structure, a passenger carrying compartment having a plurality of struts spaced from the outer surface thereof and extending longitudinally of the passenger carrying compartment, each of said struts having one end anchored to the outer surface of the passenger carrying compartment and the other end floatingly attached thereto whereby vibrations set up in the outer struts will not be transmitted to the passenger carrying compartment, the outer surface of said struts being covered with surfacing material.

TRIAN BERBECK.